United States Patent [19]

Noguchi

[11] Patent Number: 5,784,202
[45] Date of Patent: Jul. 21, 1998

[54] APPARATUS FOR ISOMETRICALLY SPLITTING BEAMS

[75] Inventor: Masato Noguchi, Tokyo, Japan

[73] Assignee: Asahi Kogaku Kogyo Kabushika Kaisha, Tokyo, Japan

[21] Appl. No.: 701,067

[22] Filed: Aug. 21, 1996

Related U.S. Application Data

[63] Continuation of Ser. No. 267,907, Jul. 6, 1994, abandoned.

[30] Foreign Application Priority Data

Jul. 8, 1993 [JP] Japan ................... 5-168809

[51] Int. Cl.$^6$ ...................... G01B 9/02
[52] U.S. Cl. ............ 359/618; 359/629; 359/638; 356/351
[58] Field of Search ............ 356/351; 359/618, 359/629, 638

[56] References Cited

U.S. PATENT DOCUMENTS

| | | | |
|---|---|---|---|
| 3,917,406 | 11/1975 | Siegler | 359/629 |
| 4,798,468 | 1/1989 | Ohuchi | 356/351 |
| 5,223,983 | 6/1993 | Oono et al. | |
| 5,257,092 | 10/1993 | Noguchi et al. | |
| 5,309,423 | 5/1994 | Noguchi et al. | |
| 5,317,144 | 5/1994 | Oono et al. | |
| 5,402,269 | 3/1995 | Oono | |
| 5,406,532 | 4/1995 | Nishikawa | |

FOREIGN PATENT DOCUMENTS 706806  4/1954  United Kingdom ............ 359/638

*Primary Examiner*—Frank G. Font
*Assistant Examiner*—Robert Kim
*Attorney, Agent, or Firm*—Greenblum & Bernstein, P.L.C.

[57] ABSTRACT

An apparatus for isometrically splitting a reference light beam into a plurality of equally split beams. The apparatus includes a plurality of beam splitters having identical reflectance and identical transmittance. The beam splitters are arranged so that the split beams are transmitted through an equal number of beam splitters and reflected by an equal number of beam splitters to obtain split beams having identical characteristics.

9 Claims, 4 Drawing Sheets

APPARATUS FOR ISOMETRICALLY SPLITTING BEAMS

This application is a continuation of application Ser. No. 08/267,907, filed Jul. 6, 1994, now abandoned.

BACKGROUND OF THE INVENTION

1. Field of the Invention

The present invention relates to a beam splitting apparatus which splits a light beam into a plurality of beams having identical characteristics.

2. Description of the Related Art

In some optical measuring instruments, a plurality of beams to be detected must be identical in intensity and quantity. For instance, there is an optical measuring instrument in which measuring light, and reference light emitted from the same light source, are made incident upon an object liquid to be detected and a reference liquid, so that the quantities of the measuring light and the reference light transmitted through the object liquid and the reference liquid are respectively detected to thereby detect the density of the concentration of the object liquid. In such an optical instrument, the quantity of the object light must be identical to that of the reference light. In some optical instruments, the object light needs to be identical to the reference light not only in quantity, but also in other optical properties, such as, for example, wavelength, incident angle, polarization state, phase difference, etc.

In conventional beam splitters, the reflecting film (or transmitting film) thereof has been designed to have identical reflectance (50%) and transmittance (50%) in order to obtain equal bundles of beams. Nevertheless, in practice, it is next to impossible for all products to have an identical ratio of reflectance and transmittance, due to manufacturing error, etc. Consequently, there is an inevitable difference in the quantity of light between two or more beams split by a beam splitter in which the beams are partly reflected by and partly transmitted through the reflecting film (or transmitting film).

SUMMARY OF THE INVENTION

A primary object of the present invention is to provide a beam splitter which isometrically splits light into beams having identical characteristics.

To achieve the object mentioned above, an apparatus is provided for isometrically splitting a reference light beam into a plurality of equally split beams. The apparatus includes a plurality of beam splitters having identical reflectance and identical transmittance. The beam splitters are arranged so that the split beams are transmitted through the same number of beam splitters and reflected by the same number of beam splitters to obtain split beams having identical characteristics.

In general, the beam splitter is made of a substrate on which an evaporating substance, such as aluminum oxide is evaporated. It has been found that substrates produced at the same time have substantially identical reflectance and transmittance properties. Consequently, in the present invention, the beam splitters are produced by the same evaporating device at the same time.

Preferably, the beam splitters are provided with reflecting/transmitting surfaces which have multiple layers of thin coatings evaporated thereon.

In one embodiment, the beam splitters are comprised of three beam splitters having light splitting surfaces which are arranged in a parallel manner so that a first split beam is split by and transmitted through the first beam splitter and reflected by the second beam splitter, and a second split beam is split by and reflected by the first beam splitter and transmitted through the third beam splitter.

The present invention can be generally applied to a beam splitting apparatus which splits a reference light beam into a number "n" of split beams, wherein there are $$\sum_{K=1}^{\eta} = k$$

beam splitters having reflecting/splitting surfaces, and wherein each split light beam is reflected once by one beam splitter and transmitted once through each of the n−1 beam splitters, respectively.

The present invention can be generally applied to a beam splitting apparatus which splits a reference light beam into a number "$2^n$" of split beams, wherein there are $3 \times (2^n - 1)$ beam splitters, and wherein each split light beam is reflected once by each of the n beam splitters and transmitted once through each of the n beam splitters, respectively.

A beam splitting apparatus according to the present invention can be applied to an interferometer in which an interference of the reference light beam reflected by a reference surface and a detecting light beam reflected by an object to be detected and superimposed on the reference light beam occurs on a detecting surface, wherein the superimposed reference light beam and the detecting light beam are split into a number "n" of equally split beams.

Preferably, the interferometer comprises a beam splitter through which coherent light emitted from a light source is transmitted, and a polarization beam splitter which reflects an S-polarized light component of the coherent light transmitted through the beam splitter towards the reference surface and which permits a P-polarized light component of the coherent light to pass therethrough towards the object to be detected.

The reference light beam reflected by the reference surface is reflected by the polarization beam splitter towards the beam splitter, and the detecting light beam reflected by the object to be detected is transmitted through the polarization beam splitter, and the reference light beam and the detecting light beam are reflected by the beam splitter towards the splitting apparatus.

A provision is also made of six beam splitters for splitting each of the reference light beam and the detecting light beam into three equally split beams including a first split beam split by and reflected by the first beam splitter and transmitted through the second and third beam splitters; a second split beam transmitted through the first beam splitter and split and reflected by the fourth beam splitter and transmitted through the fifth beam splitter; and a third split beam transmitted through the first and forth beam splitters and reflected by the sixth beam splitter.

It is possible to provide first, second and third sensors which receive the first, second and third split beams.

Furthermore, the apparatus can be comprised of analyzers provided between the sensors and the beam splitters.

Preferably, there are two analyzers in the form of quarter and half wave plates provided between two of the sensors and the beam splitters.

According to another aspect of the present invention, there is provided an apparatus for isometrically splitting a light beam into a plurality of split beams having an identical phase, wherein the apparatus includes a plurality of beam splitters having identical reflectance and identical transmittance, and wherein the beam splitters are arranged so that the split beams are transmitted through the same number of beam splitters and reflected by the same number of beam splitters, at least one of the beam splitters on the optical path of the split beams being arranged with an incident plane perpendicular to the incident plane of the other beam splitters.

The incident plane refers to a plane including the direction of propagation of a wave striking a reflecting/transmitting surface of the beam splitter and a line perpendicular to the surface.

The present disclosure relates to subject matter contained in Japanese patent application No. HEI 5-168809 (filed on Jul. 8, 1993) which is expressly incorporated herein by reference in its entirety.

BRIEF DESCRIPTION OF THE DRAWINGS

The present invention will be described below in detail with reference to the accompanying drawings, in which.

DESCRIPTION OF THE PREFERRED EMBODIMENTS

Figure 1:
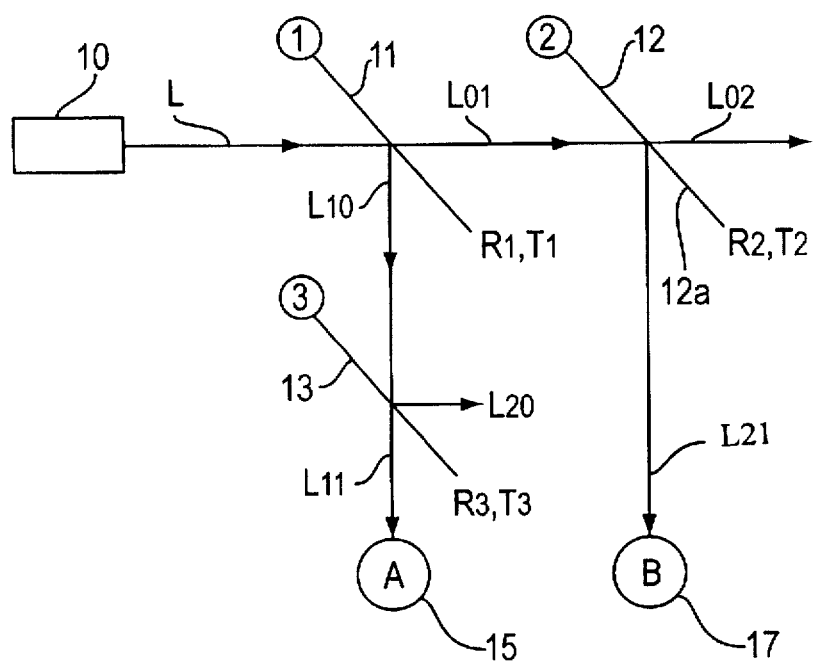
FIG. 1 is a side elevational view of an optical arrangement of a beam splitting apparatus according to a first embodiment of the present invention.

FIG. 1 shows a first embodiment of a beam splitter, according to the present invention, in which a light beam is split into two equal quantities of light (i.e., two equal beams).

In the embodiment illustrated in FIG. 1, there are three beam splitters 11, 12 and 13 having identical reflectance and transmittance. Note that in FIG. 1, while the beam splitters 11, 12 and 13 are made of parallel plates, they are designated by lines representing reflecting and transmitting surfaces coated with a metal or dielectric layer (i.e., surfaces on which multiple metal or dielectric layers are applied through vapor deposition), for clarity. The beam splitters are not limited to those discussed above, and can be, for example, cemented rectangular prisms which are provided with oblique surfaces coated with a metal or dielectric layer.

Beam splitters 11, 12 and 13 are preferably produced at the same time, using the same evaporating apparatus or furnace, so that they have identical reflectance and transmittance. Alternatively, it is possible to individually produce the beam splitters, and then select beam splitters having identical reflectance and transmittance.

Reference light L emitted from a coherent light source 10 is split into two beams $L_{01}$ and $L_{10}$ by the first beam splitter 11. The beam $L_{10}$ reflected by the first beam splitter 11 is transmitted through the third beam splitter 13 towards a first light path 15. The split light $L_{11}$ which approaches the first light path 15 has been reflected once by the first beam splitter and transmitted once through the third beam splitter. The split light $L_{01}$ transmitted through the first beam splitter 11 is reflected by the second beam splitter 12 at the boundary surface 12a thereof towards a second light path 17. Namely, the split light $L_{21}$, which reaches the second light path 17, has been transmitted once through the first beam splitter 11 and reflected once by the second beam splitter 12.

Intensities IA and IB of the split beams $L_{11}$ that reach the first and second light paths 15 and 17 are respectively represented by the following equations;

$$IA = I \times R1 \times T3$$

$$IB = I \times T1 \times R2$$

wherein "R1" and "R2" (and "R3") designate the reflectance of the first and second (and third) beam splitters 11 and 12 (and 13); "T1" and "T3" (and "T2") the transmittance of the first and third (and second) beam splitters 11 and 13 (and 12); and "I" the intensity of the reference light L, respectively. Namely, if $R1 \times T3 = T1 \times R2$, we have IA=IB. In the illustrated embodiment, R1=R2=R3=R and T1=T2=T3=T, and accordingly, IA=IB.

As can be understood from the foregoing, in the first embodiment of the present invention, since three beam splitters 11, 12 and 13 having identical reflectance and transmittance are used to realize one reflection and one transmission of the reference light by the beam splitters, even if the reflectance R is not identical to the transmittance T in each beam splitter, a plurality of split beams having an identical intensity (i.e., quantity of light) can be obtained owing to the equal reflectance and equal transmittance in the three beam splitters.

The reflectance and/or the transmittance may differ depending on the polarization. Assuming that the reflectances and the transmittances of the S-polarized light component and P-polarized light component in the beam splitters 11, 12 and 13 are RS, RP and TS and TP, respectively, the intensities IAS and IAP of the S-polarized light component and P-polarized light component in the opticalpaths 15 (A) and the intensities IBS and IBP of the S-polarized light component and P-polarized light component in the optical paths 17 (B) are given by the following equations:

$$IAS = IBS = IS \times RS \times TS \text{ and}$$

$$IAP = IBP = IP \times RP \times TP.$$

Thus, the S-polarized light component that reaches the optical paths 15 and 17 can be equally split, and the P-polarized component light that reachs the optical paths 15 and 17 can be equally split.

In the first embodiment illustrated in FIG. 1, there is a difference in ratio of the S-polarized light component and the P-polarized light component between the reference light and the split beams.

The reference light L emitted from a predetermined light source is transmitted through a beam splitter 20 and made incident upon a polarization beam splitter 28. The S-polarized light component of the split beam incident upon the polarization beam splitter 28 is reflected by a reflecting/transmitting surface 28a of the polarization beam splitter 28. On the other hand, the P-polarized light component of the split beam incident upon the polarization beam splitter 28 is transmitted through the reflecting/transmitting surface 28a.

The S-polarized light component reflected by the reflecting/transmitting surface 28a is reflected by a reference mirror 31 and is returned to the polarization beam splitter 28 along the same optical path as the incident beam. The S-polarized light is reflected by the reflecting/transmitting surface 28a of the polarization beam splitter 28 towards the beam splitter 20.

The P-polarized light component transmitted through the polarization beam splitter 28 is reflected by a sample 33 and is returned to and transmitted through the polarization beam splitter 28 in the direction opposite to the direction of the incident beam toward the beam splitter 20.

The P-polarized light component and the S-polarized light component returned from the polarization beam splitter 28 are reflected by the reflecting/transmitting surface 20a of the beam splitter 20 and made incident upon the first beam splitter 21. The P-polarized component light and S-polarized light component incident upon the beam splitter 21 are split into beams reflected by and transmitted through the reflecting/transmitting surface 21a thereof. The P-polarized light component and S-polarized light component reflected by the reflecting/transmitting surface 21a are transmitted through the second and third beam splitters 22 and 23 as split beams L1. The split beams L1 are then transmitted through an analyzer $PL_1$ and made incident upon a sensor 41. The split beams L1 transmitted through the analyzer $PL_1$ interfere, and the sensor 41 detects the interference condition.

The P-polarized light component and S-polarized light component transmitted through the first beam splitter 21 are incident upon a reflecting/transmitting surface 24a of a fourth beam splitter 24 and are split into beams reflected by and transmitted through the reflecting/transmitting surface 24a. The reflected beams are transmitted through a fifth beam splitter 25 as split beams L2. The split beams L2 are then incident upon a quarter wave plate 35 in which the phase of oscillation of the light component within a plane parallel with the sheet of the drawing is retarded by $\pi/2$ and is then transmitted through an analyzer $PL_2$ and made incident upon a sensor 42. The split beams L2 transmitted through the analyzer $PL_2$ interfere, and the sensor 42 detects the interference condition.

The P-polarized light component and S-polarized light component transmitted through the fourth beam splitter 24 are reflected by a reflecting/transmitting surface 26a of a fifth beam splitter 26 as split beams L3. The split beams L3 are then incident upon a half wave plate 36 in which the phase of oscillation of the light component within a plane parallel with the sheet of the drawing is retarded by $\pi$ and is then transmitted through an analyzer $PL_3$ and made incident upon a sensor 43. The split beams L3 transmitted through the analyzer $PL_3$ interfere, and the sensor 43 detects the interference condition.

The sensors 41, 42 and 43 can be, for example, two-dimensional CCD image sensors. The optical distances of the split beams emitted from the light source, reflected by the sample 33, and made incident upon the sensors 41, 42 and 43 are identical to those of the split beams reflected by the reference mirror 31 and made incident upon the sensors 41, 42 and 43.

Figure 2:
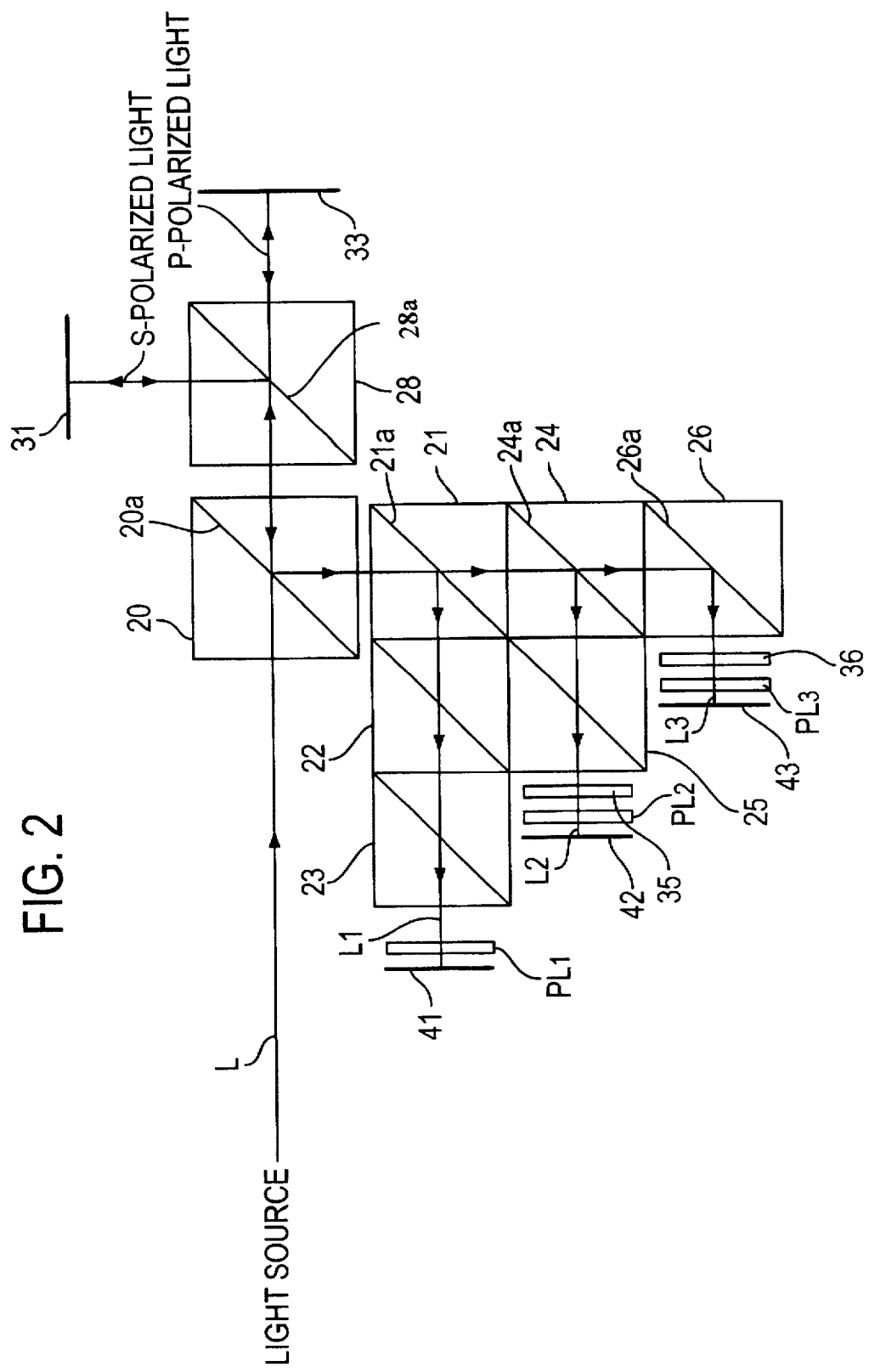
FIG. 2 is a side elevational view of an optical arrangement of a beam splitting apparatus according to a second embodiment of the present invention.

In the second embodiment shown in FIG. 2, the beam splitters 21 through 26 have identical reflectance and transmittance. It is assumed here that the reflectance and transmittance of the S-polarized light component in each beam splitter are RS and TS; the reflectance and transmittance of the P-polarized light component in each beam splitter are RP and TP; and, the phase differences caused by the reflection by and transmission through each beam splitter are $\alpha r$ and $\alpha t$, respectively. The bundles of beams incident upon the sensors 41, 42 and 43 are reflected once by one of the identical beam splitters 21 through 26 and transmitted twice through two of the identical beam splitters 21 through 26. Namely, the intensities of the S-polarized light component and P-polarized light component of each split beam transmitted through the beam splitters 23, 25 and 26 are represented by:

TS×TS×RS, and

TP×TP×RP.

The phase difference of the S-polarized light component and P-polarized light component of each split beam is represented by:

$2\alpha t + \alpha r$.

The intensities of the S-polarized light component and P-polarized light component incident upon the sensors 41, 42 and 43 are identical when the transmission direction θ of light in the analyzers $PL_1$ and $PL_2$ satisfies the following relationship:

$\tan\theta = (TP2 \times RP)/(TS2 \times RS)$.

Note that although the S-polarized light component and P-polarized light component have a phase difference of $(2\alpha t + \alpha r)$ therebetween in each beam splitter, the phase difference can be ignored in an interferometer.

As can be seen from the above discussion, in the second embodiment, the intensities of the S-polarized light component and the P-polarized light component of the split beams emitted from the beam splitters 23, 25 and 26 can be easily made identical, regardless of the reflectance and transmittance of the beam splitters 21 through 26.

Furthermore, since the wave plates 35 and 36 whose phase differs by $\lambda/4$ are provided between the beam splitters 25 and 26, and the sensors 42 and 43, respectively, the three split beams can be viewed in the state in which there is a phase difference of 90° through the respective sensors 41, 42 and 43. The phase difference between the sensors 41 and 42, and between sensors 42 and 43 is 90°. The phase difference between the sensors 41 and 43 is 180°.

Figure 3:
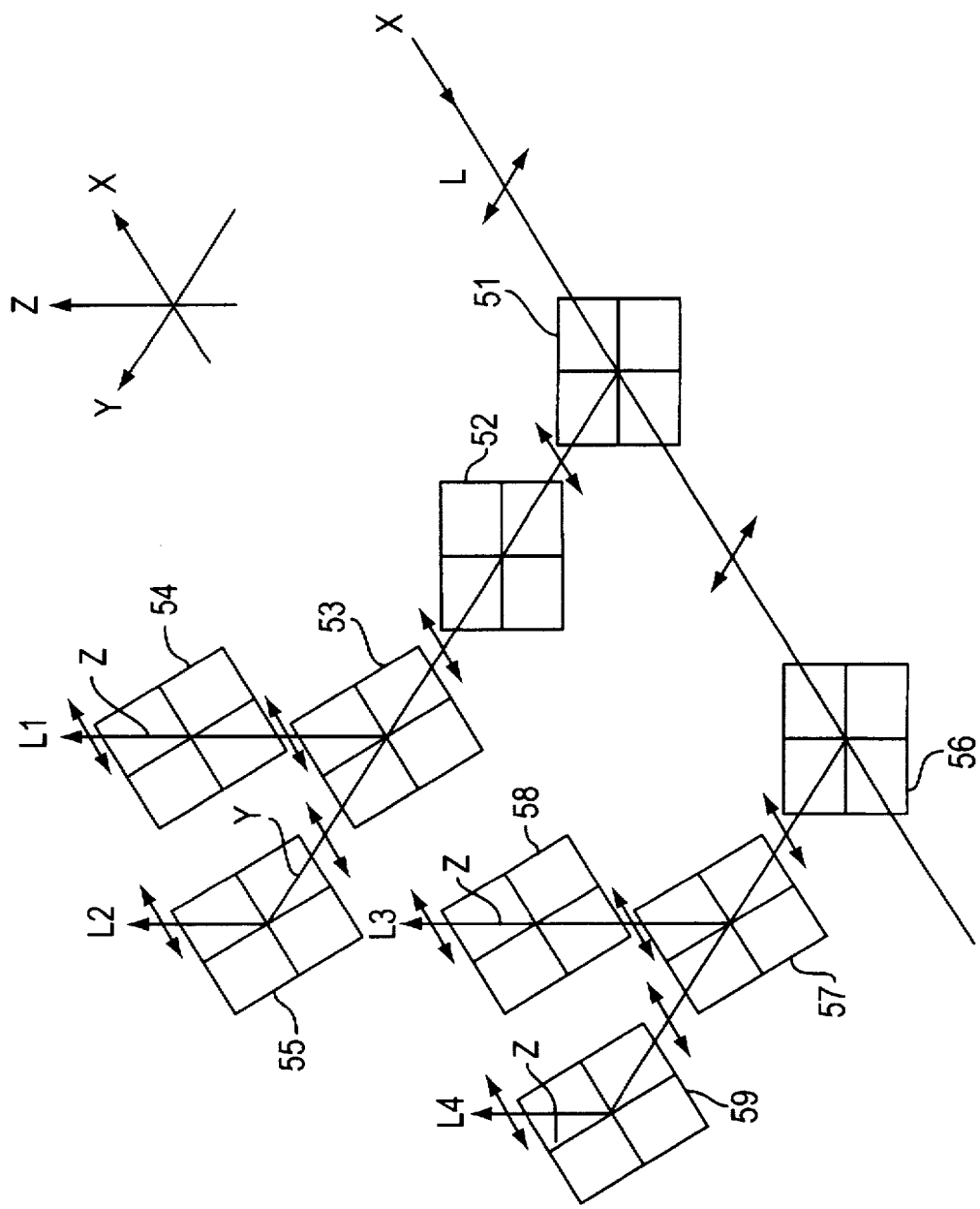
FIG. 3 is a side elevational view of an optical arrangement of a beam splitting apparatus according to a third embodiment of the present invention.
Figure 4:
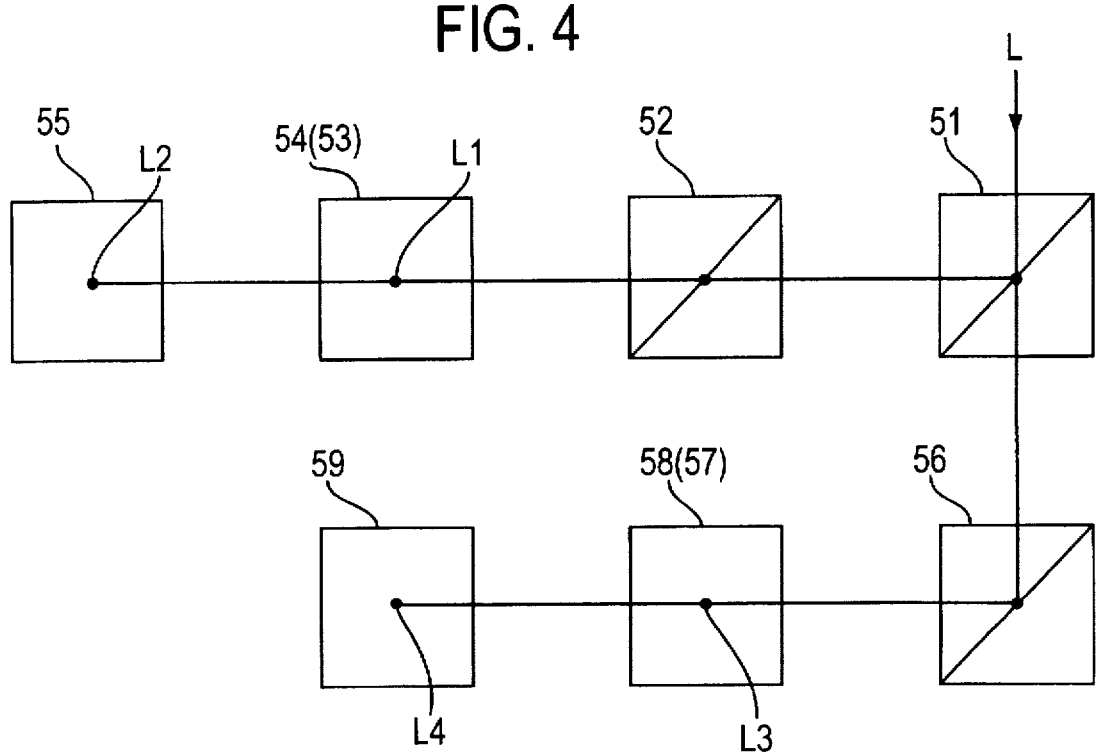
FIG. 4 is a plan view of an optical arrangement of the beam splitting apparatus shown in FIG. 3; and, FIG. 5 is a front elevational view of an optical arrangement of the beam splitting apparatus shown in FIG. 3.
Figure 5:
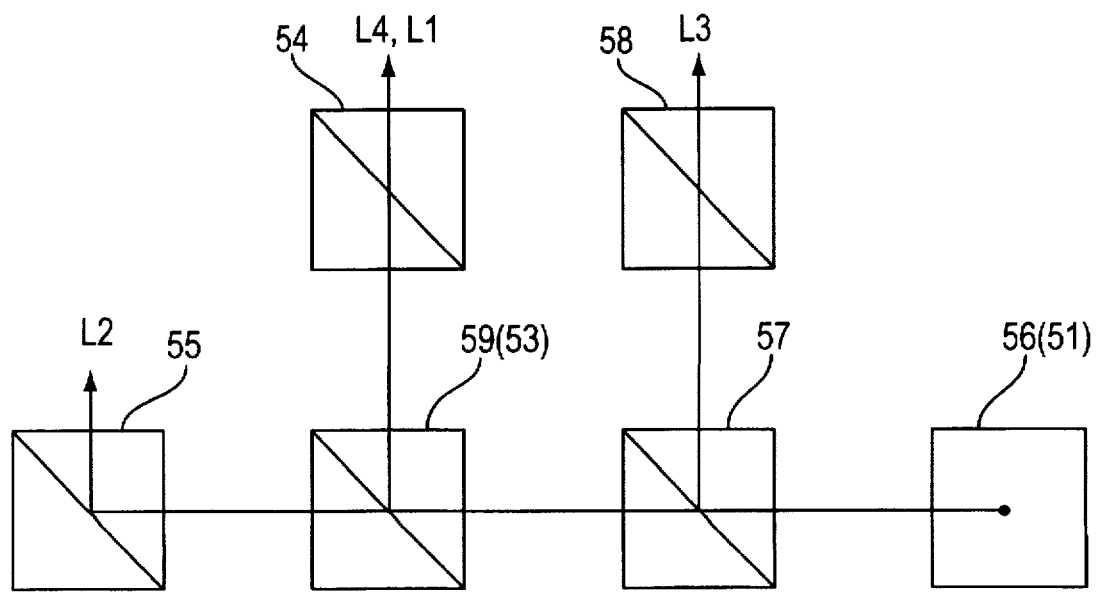

FIGS. 3 through 5 show a third embodiment of the present invention, in which light is isometrically split into four beams without changing the polarization state of the light to be measured. In the third embodiment, there are two reflections and two transmissions of each split beam. Unlike the first and second embodiments, in which the incident plane of the reflecting/transmitting surface are parallel, the incident plane of the reflecting/transmitting surface are normal to each other in the third embodiment.

The measuring light (i.e., reference light) L emitted from the light source is linearly polarized light whose plane of polarization is contained in the orthogonal X-Y plane. The reference light L incident upon the first beam splitter 51 along the X-axis is reflected by and transmitted through the splitting surface thereof in the Y direction and the X direction, respectively. The split beam reflected in the Y direction is transmitted through the second beam splitter 52 and made incident upon the third beam splitter 53. The split beam is reflected by and transmitted through the third beam splitter 53 in the Z direction perpendicular to the X and Y directions and in the Y direction, respectively. The split beam reflected in the Z direction is made incident upon the fourth beam splitter 54, wherein the split beam in the Z direction is transmitted therethrough and utilized as a first split beam L1. The split beam transmitted through the third beam splitter 53 in the Y direction is made incident upon the fifth beam splitter 55, wherein the split beam is reflected in the Z direction and utilized as a second split beam L2.

The split beam transmitted through the first beam splitter 51 in the X direction is made incident upon a sixth beam splitter 56, wherein the split beam is reflected by and transmitted through the sixth beam splitter 56 in the Y direction and X direction, respectively. The split beam reflected in the Y direction is made incident upon a seventh beam splitter 57. The split beam is reflected by and transmitted through the seventh beam splitter 57 in the Z direction and in the Y direction, respectively. The split beam reflected in the Z direction is made incident upon an eighth beam splitter 58. The split beam transmitted through the eighth beam splitter 58 in the Z direction is utilized as a third split beam L3. The split beam transmitted through the seventh beam splitter 57 in the Y direction is made incident upon a ninth beam splitter 59. The split beam reflected by the ninth beam splitter 59 in the Z direction is utilized as a fourth split beam L4. As mentioned above, since the four split beams L1 through L4 are each reflected once in the Y direction and once in the Z direction by the identical beam splitters 51 through 59, and are transmitted twice through the respective beam splitters, the split beams L1 through L4 have the same quantity of light and the polarization state thereof is identical to that before the incidence. Consequently, the respective split beams L1 through L4 can be simultaneously viewed through the respective analyzers whose polarization direction differs by 45° from one another.

In the prior art, the analyzers are rotated from the reference angle (0°) to angles of 45°, 90°, and 135° to observe the split beams. However, in third embodiment of the present invention, since the four split beams of the same polarization state are obtained, the analyzers can be fixed at angular positions of 0°, 45°, 90°, and 135° upon observation. Consequently, in the illustrated embodiment of the present invention, it is not necessary to mechanically rotate the analyzers. Accordingly, a phenomenon which varies suddenly or within an extremely short space of time can be easily detected.

Although the reference light is equally split into two (first embodiment), three (second embodiment), or four (third embodiment) split beams in the above-mentioned embodiments, the invention can be generally applied to a beam splitter which splits light into n split beams (n being an integer greater than 2).

In the case that the reference light beam into a number n of split beams, $$\sum_{K=1}^{n} = k$$

beam splitters are arranged such that each split beam is reflected once by one beam splitter and transmitted once through the (n−1) beam splitters.

Splitting the reference light beam into a number "$2^n$" of split beams, $3\times(2^n-1)$ beam splitters are arranged such that each split beam is reflected once by each of the n beam splitters and transmitted once through the n beam splitters (n being an integer greater than 1).

As can be seen from the above discussion, according to the present invention, since the split beams are reflected an equal number of times by beam splitters having an identical reflectance and are transmitted an equal number of times through the beam splitters which have an identical transmittance, even if the reflectance and transmittance of each individual beam splitter are not identical, split beams having the same quantity of light can be obtained.

According to the third embodiment of the present invention, since the same number of reflections of light beams by identical beam splitters having identical reflectance and transmittance properties, and the same number of transmissions of light through these beam splitters takes place, and since at least one reflection of light in a direction perpendicular to planes including the direction of the reflections and the transmissions, the same quantity and phase of split beams can be easily obtained.

I claim:

1. An apparatus for splitting a light beam into a plurality of split beams, comprising:

a plurality of beam splitters having identical reflectance characteristics and identical transmittance characteristics, said beam splitters being arranged so that said plurality of split beams are transmitted through an equal number of beam splitters and reflected by an equal number of beam splitters; and at least one of said plurality of beam splitters having a splitting surface positioned with an incident plane normal to an incident plane of another of said plurality of beam splitters, each of said incident planes being defined by a normal to a splitting surface of the beam splitter at a point at which a beam of light strikes the splitting surface, and a direction of said beam of light incident on the splitting surface;

wherein at least one of said plurality of split beams which interacts with said at least one of said plurality of beam splitters emerges from said apparatus with in-phase polarization components.

2. The beam splitting apparatus of claim 1, wherein said plurality of beam splitters being produced at a same time with a same vapor deposition device.

3. The beam splitting apparatus according to claim 1, wherein each of said plurality of split beams interact with four beam splitters.

4. The beam splitting apparatus according to claim 1, wherein each of said plurality of split beams are transmitted through and are reflected by two of said plurality of beam splitters, respectively.

5. The beam splitting apparatus according to claim 1, wherein a polarization state of said light beam before being incident onto said plurality of beam splitters is identical to a polarization state of said light beams split by said plurality of beam splitters.

6. The beam splitting apparatus according to claim 1, at least one of said beam splitters reflecting incident light in a direction perpendicular to a plane defined by directions of transmission and reflection of said other beam splitters.

7. The beam splitting apparatus according to claim 1, wherein said light beam is split into $2^n$ split beams using beam splitters, where n is an integer.

8. The beam splitting apparatus according to claim 7, wherein said light beam is reflected once by n beam splitters and transmitted once by n beam splitters.

9. An apparatus for splitting a light beam into a $2^n$ split beams having identical polarization components, comprising:

a plurality of beam splitters having substantially identical reflectance characteristics and substantially identical transmittance characteristics, said plurality of beam splitters being arranged so that each of said $2^n$ split beams are transmitted through n number of beam splitters and reflected by n number of beam splitters, a total number of said plurality of beam splitters being given by the following relationship:

$$3\times(2^n-1)$$

where n is a positive integer greater than 2; and each of said plurality of beam splitters having a splitting surface positioned with an incident plane being defined by a normal to a splitting surface of the beam splitter at a point at which a beam of light strikes the splitting surface, and a direction of said beam of light incident on the splitting surface;

wherein at least two of said plurality of beam splitters have incident planes which are normal to each other, and an equal number of said plurality of beam splitters have incident planes which are coincident with each other;

wherein at least n of said plurality of split beams emerge from said apparatus with in-phase polarization components.

* * * * *